US010026218B1

(12) United States Patent
Mertens et al.

(10) Patent No.: US 10,026,218 B1
(45) Date of Patent: Jul. 17, 2018

(54) MODELING INDOOR SCENES BASED ON DIGITAL IMAGES

(71) Applicant: Pencil and Pixel, Inc., San Francisco, CA (US)

(72) Inventors: Tom Mertens, Wijnegem (BE); Juan Vasquez, Oakland, CA (US)

(73) Assignee: PENCIL AND PIXEL, INC., San Francisco, CA (US)

( * ) Notice: Subject to any disclaimer, the term of this patent is extended or adjusted under 35 U.S.C. 154(b) by 0 days.

(21) Appl. No.: 15/800,457

(22) Filed: Nov. 1, 2017

(51) Int. Cl.
G06T 17/00 (2006.01)
G06T 15/20 (2011.01)
H04N 13/04 (2006.01)
G06T 7/536 (2017.01)

(52) U.S. Cl.
CPC ............ G06T 15/205 (2013.01); G06T 7/536 (2017.01); G06T 17/00 (2013.01); H04N 13/0429 (2013.01)

(58) Field of Classification Search
CPC .. G06F 17/5004; G06T 19/00; G06T 2210/04
See application file for complete search history.

(56) References Cited

U.S. PATENT DOCUMENTS

| 2015/0363971 A1* | 12/2015 | Pan | G06T 17/00 345/420 |
| 2016/0217225 A1* | 7/2016 | Bell | G06F 17/5004 |
| 2017/0098309 A1* | 4/2017 | Michel | B25J 9/1692 |
| 2017/0352257 A1* | 12/2017 | Oliver | H04W 4/04 |

* cited by examiner

Primary Examiner — Phi Hoang
(74) Attorney, Agent, or Firm — Hickman Palermo Becker Bingham LLP

(57) ABSTRACT

Techniques are provided for modeling indoor scenes including receiving a request for a 3D model of an indoor scene based on multiple flat images of the indoor scene, where the images obey no more than a limited overlap requirement, are absent of depth information, and are taken from one or more viewpoints. The techniques proceed by determining vanishing points in the images, receiving floor contour information that was determined based on the vanishing points; reconstructing the 3D vertex positions of two or more floor plan parts using a geometric constraint matrix that encodes coordinate equalities among said vertices, based on the floor contour information; and assembling a combined floor plan based at least in part on the floor plan parts. The techniques proceed by receiving a floor plan outline indicating walls and generating the 3D model of the indoor scene based on the floor plan outline.

21 Claims, 9 Drawing Sheets

FIG. 5
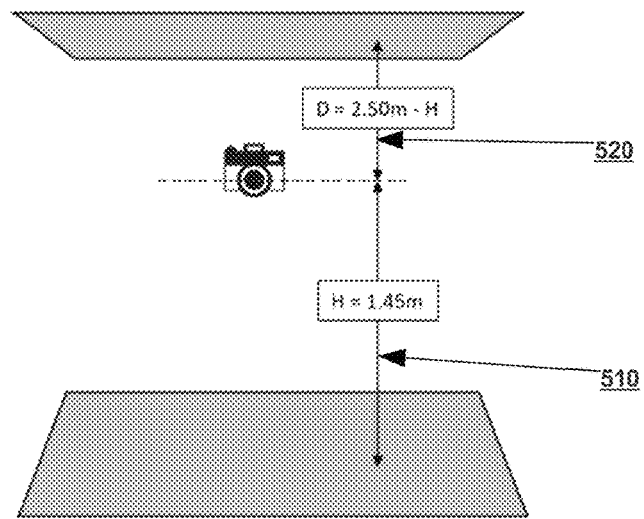
FIG. 6A    FIG. 6B
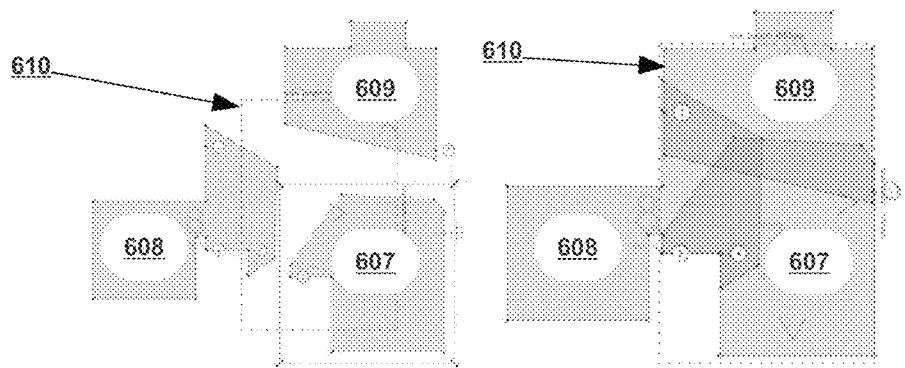
FIG. 7A   FIG. 7B   FIG. 7C   FIG. 7D
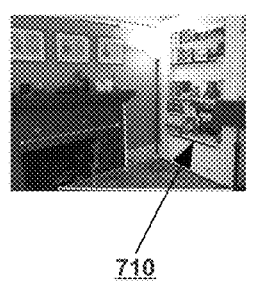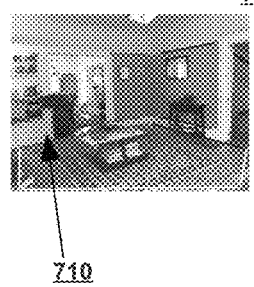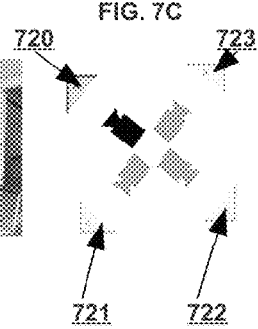

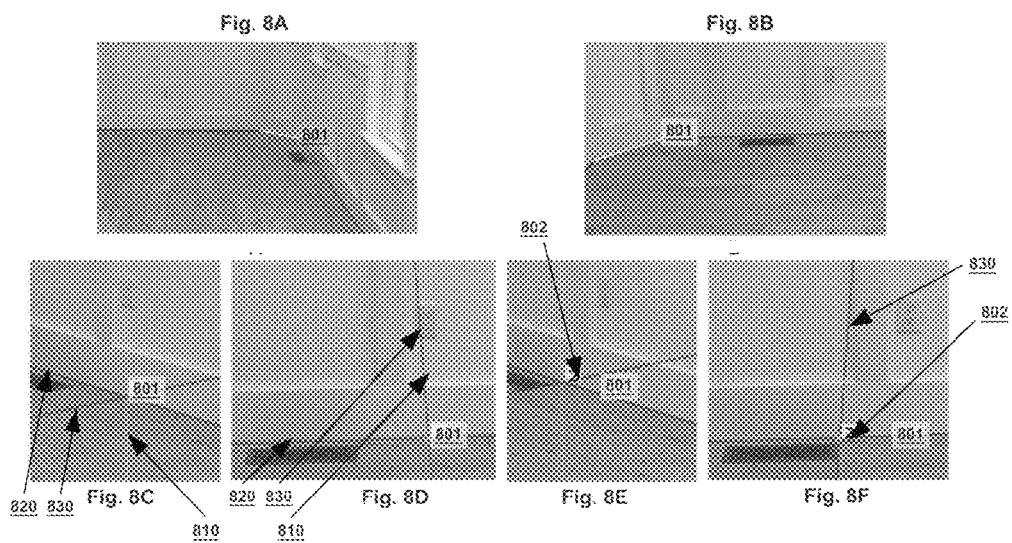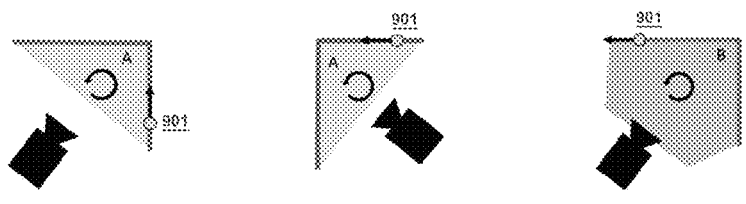

MODELING INDOOR SCENES BASED ON DIGITAL IMAGES

FIELD OF THE INVENTION

The invention generally relates to three-dimensional modeling and mode specifically to modeling indoor scenes based on digital images.

BACKGROUND

Modeling three-dimensional (3D) scenes is an important technical task for numerous industries. It is especially important for the fields of architecture, structural engineering, and interior design, just to name a few. Despite recent progress in image-based modeling and scanning techniques, it remains challenging to recover a high-quality 3D model of an arbitrary indoor scene. Indoor reconstruction approaches in the past have relied exclusively on structure-from-motion (SfM), requiring images from many points in a room, with high overlap among the images.

Some techniques for 3D model reconstruction require that a space is acquired using tens or hundreds of photos, while the photographer should be aware of sufficient continuity and overlap. However, this poses a significant burden on the photographer, given the time it takes to acquire said amount. She or he may also not be aware of overlap requirements or be skilled enough to observe them. In addition, clutter and furniture are a common hindrance that render large parts of the photos obsolete as they occlude important structural cues such as floor-wall boundaries. In summary, the main challenge boils down to dealing with a lack of image data.

The techniques herein address these challenges.

SUMMARY

The appended claims may serve as a summary of the invention.

BRIEF DESCRIPTION OF THE DRAWINGS

In the drawings:

FIG. 5 depicts that the average height of camera and ceiling being used for scale.

FIG. 6A and FIG. 6B depict user interfaces for manually aligning floor plan parts.

FIG. 7A and FIG. 7B depict two adjacent views of the looking at two corners of the same wall.

FIG. 7C and FIG. 7D depict possible camera orientations for the scene of FIG. 7A and FIG. 7B.

FIG. 8A, FIG. 8B, FIG. 8C, FIG. 8D, FIG. 8E, FIG. 8F depict point correspondences in an indoor scene.

FIG. 9A, FIG. 9B, FIG. 9C depict resolution of rotational ambiguity.

DETAILED DESCRIPTION

1.0 Introduction

Figure 1:
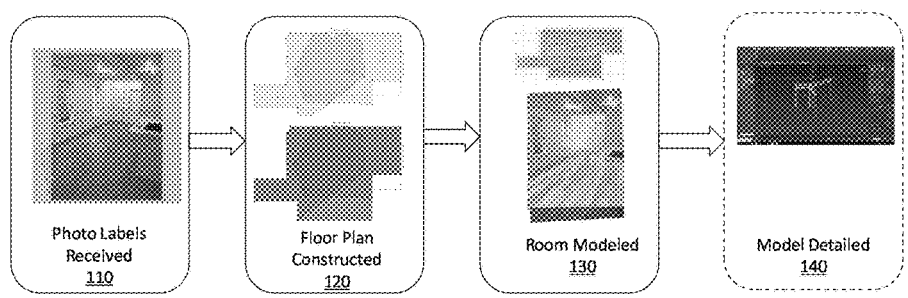
FIG. 1 depicts an example process for modeling indoor scenes based on digital images.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections according to the following outline:
1.0 INTRODUCTION
2.0 GENERAL OVERVIEW
3.0 GENERAL DISCUSSION
   3.1 LABEL PHOTO
   3.2. CONSTRUCT FLOOR PLAN
   3.3. MODEL ROOM
4.0 PHOTO LABELING
   4.1 VANISHING POINT AND LINE ANALYSIS
   4.2 SINGLE-VIEW RECONSTRUCTION
   4.3 OCCLUSION HANDLING
5.0 FLOOR PLAN CONSTRUCTION
   5.1 SCALING TO ABSOLUTE UNITS
   5.2 ALIGNMENT OF FLOOR PLAN PARTS
   5.3 FLOOR PLAN TRACING
6.0 FUNCTIONAL OVERVIEW
7.0 EXAMPLE SYSTEMS
8.0 HARDWARE OVERVIEW

2.0 General Overview

Recovering 3D structure from one or more images is long-standing topic in computer vision. It can be challenging and is often an ill-posed problem. Despite recent progress in image-based modeling and scanning techniques, it remains challenging to create a high-quality 3D model of an arbitrary indoor scene. Techniques herein address the problem of reconstructing and modeling a 3D model of residential indoor spaces from a sparse set of photographs without depth (e.g., "flat" images). The reconstructed 3D model may be a CAD (computer-aided design) or a model in any other format. In some embodiments, the techniques are able to recover the structural, fixed geometry of the space, while objects such as furniture can be to be ignored.

As noted elsewhere herein, some techniques for 3D model reconstruction require that a space is acquired using tens or hundreds of photos, while requiring the photographer to be sufficiently aware of continuity and overlap. Techniques herein address this issue by recovering a 3D model regardless of the quality and size of the input.

One approach to indoor scene capture is to use specialized camera hardware to efficiently capture, such as wide-angle, panoramic and stereo cameras RGB-D (red green blue depth) cameras and multi-camera systems. A problem with these approaches is the cost of acquisition and complexing of use of such systems. The techniques described herein can work with simple photographic input.

Another approach to indoor scene capture is doing image-based 3D reconstruction algorithms using parallax. Binocular or two-view stereo takes as input two images shot at different viewpoints, from which a dense (per-pixel) depth map is computed by means of triangulation. Multi-view stereo algorithms extend this idea to three or more views. Structure-from-Motion (SfM) algorithms work off either an image sequence (e.g., frames of a walkthrough video) or an unordered collection of photographs. Using this one can triangulate a sparse point cloud and estimate camera parameters for each image (e.g., lens parameters and pose). Methods have been proposed to also reconstruct dense clouds or triangle meshes, which can be rendered using common computer graphics techniques. A fundamental assumption of any N-view reconstruction method is that any part of the scene is covered by at least two photos with sufficiently different vantage points as to establish parallax. This can be a difficult constraint to satisfy and some areas of rooms and scenes may not have any coverage. Techniques herein address these issues.

Single-view reconstruction or monocular algorithms aim to recover 3D geometry or a depth map from a single image. Without applying triangulation for reconstruction, these methods usually require user input to guide the reconstruction algorithm unless strong assumptions can be made about the scene. In some embodiments, the techniques herein use single-view reconstruction using a method that exploits a relaxed Manhattan-world assumption for reconstructing a polygonal model of a photo. Being single-view-based, these embodiments are inherently less dependent on overlap requirements. Some embodiments require some overlap and continuity (described in Section 3 and elsewhere herein). In some embodiments, the single-view reconstruction can be used to reconstruct the major surfaces in a room, which may be useful for obtaining the shape and dimensions of the floor or ceiling.

CAD and modeling software can also be used to model 3D indoor spaces using photographs as reference. This is a manual and laborious process that requires skillful artists to reproduce a scene with high fidelity, while still being error prone in terms of proportions. Some modeling applications existing that allow for overlaying photographs during modeling. For instance, some software applications allow the user to draw on top of a photo after having manually annotated vanishing points. However, this simple workflow is designed to be applied to single-images at a time and does not support fusing single-view reconstructions into a combined one. Technique described herein address those issues.

Some image-based modeling methods register and match a collection of 3D primitive shapes to one or more images, such as cuboids and pyramids. However, these shapes must first be manually compiled and initialized, which is a cumbersome process. A related body of work known as image-based rendering (IBR) aims to render view-points without the intermediate step of reconstructing a full 3D model. As with image-based modeling systems, most IBR approaches compute coarsely approximating geometry or "proxy" while projecting the input images onto said geometry to simulate photorealistic results. Some IBR methods rely on N-view reconstruction methods to obtain proxies, and therefore require dense sampling of vantage points. Techniques herein address these issues.

Many indoor reconstruction methods take plain photos as input but rely on SfM to estimate camera poses and scene structure, which in turn assumes a dense sampling of vantage points. In practice, this could require many hundreds of photographs per room, depending on the size, while ensuring ample overlap. Techniques described herein can work with far fewer photographs, without strict requirements related to parallax and overlap.

Even if one were to use an automated reconstruction approach, it might still require hundreds of photos if it depends on SfM to obtain scene structure and camera poses (in addition to other failings described above). Techniques described herein overcome this issue by, in some embodiments, using a single-view reconstruction method which also recovers camera pose per photo, while relative camera poses among photos are recovered based on a minimal set of manually-specified point correspondences.

The techniques herein provide a multi-stage and labeling-driven process that produces an accurate floor plan. This floor plan can be easily converted to a 3D model. This is described more herein, for example, see section 3.

The techniques herein also provide a user interface that allows axial snapping and 3D crosshairs based on vanishing points (described elsewhere herein) which enable occlusion-aware editing. This is described elsewhere herein, for example, see sections 4.1-4.3. The interface also allows for manipulation of floor plan parts to align them (e.g., see section 5.1 and elsewhere herein) and tracing the final plan (e.g., see section 5.3 and elsewhere herein).

The techniques herein provide for a single-view reconstruction using a simple single-view reconstruction algorithm based on a relaxed Manhattan-world assumption (see section 4.2 and elsewhere herein).

The techniques provide for a floor plan construction by automatically aligning floor plan parts obtained from single-view reconstructions, which considers rotation ambiguities and scale differences (e.g., see section 5.2 and elsewhere herein).

3.0 General Discussion

In this section, numerous embodiments are discussed. Some of those embodiments are discussed from a high-level view in this section, and are discussed in more depth elsewhere herein. In some embodiments, techniques herein are used to produce a 3D model of an indoor scene. In some embodiments, the process from 110 to 130 is used to produce a floor plan annotated with measurements, door and window positions, and/or a CAD model that contains the extruded walls from the floor plan. Detailing 140 of the model is optionally performed after 110 to 130.

3.1 Label Photos

Turning to the beginning of process 100, photo labels are received 110. In some embodiments, a user labels a floor polygon in each input photo guided by vanishing points. The vanishing points may be obtained automatically by detecting straight line segments in the image, classifying them to each of the three cardinal axes X, Y or Z, and computing the common intersection point per axis. These segments and their classification may also be defined manually by the user or another. In some embodiments, the user (or another party) may provide measurement annotations, which can either be (1) known lengths (2) or equality constraints that equate edge lengths across views. Further, if items of known lengths are in the images, then the items of known length can be used to determine lengths of other items in the image. Further, items in one input image may be determined to represent the same item in another input image, and therefore, if items in one image are of known length, then the lengths in another image may be determined based on those known lengths.

In some embodiments, point correspondences among images may be received. For example, a user may specify point correspondences between different views in the images. If, for example, the floor may be too cluttered to reliably outline the floor, then a user may draw a ceiling polygon instead of a floor polygon, which usually has the same shape. The photo labeling may be designed to allow for drawing generic geometry, including walls and other surfaces. This can be useful to indicate point correspondences more easily, or to draw a more complicated room structure, and the like. In some embodiments, the techniques may be able to produce a reconstruction based only on the floors and/or ceilings.

3.2. Construct Floor Plan

In some embodiments, labeled photos are used to construct a floor plan. For example, each labeled photograph may correspond to a portion of a floor plan. These portions may be assembled into a full plan. The final contour of the floor plan can then be determined or received. For example, the final contour of the floorplan may be determined based on the portions assembled into the full floor plan. In some embodiments, a user may also indicate the contour of the floor plan. Doing so may be beneficial if the user may indicate contours for missing walls.

3.3. Model Room

In some embodiments, walls can be extruded based on the floor plan. For example, once the floor plan is available, walls along the outside contours of the floorplan can be extruded from it. Further, in some embodiments, the floor and walls can be rendered based on the input photos. For example, in some embodiments, the input photos may be used to create texture maps for the polygons associated with the floor and/or walls. In some embodiments, camera pose is estimated for one or more of the input images. Based on the estimation of camera pose, the 3D model will be accurately registered with the photos. In some embodiments, this allows annotation of windows and/or doors based on the images (or texture maps) without going through the burden of manually entering dimensions. The resulting door and window position can be directly applied to the extruded 3D model and/or they can be integrated into the floor plan.

Figure 2:
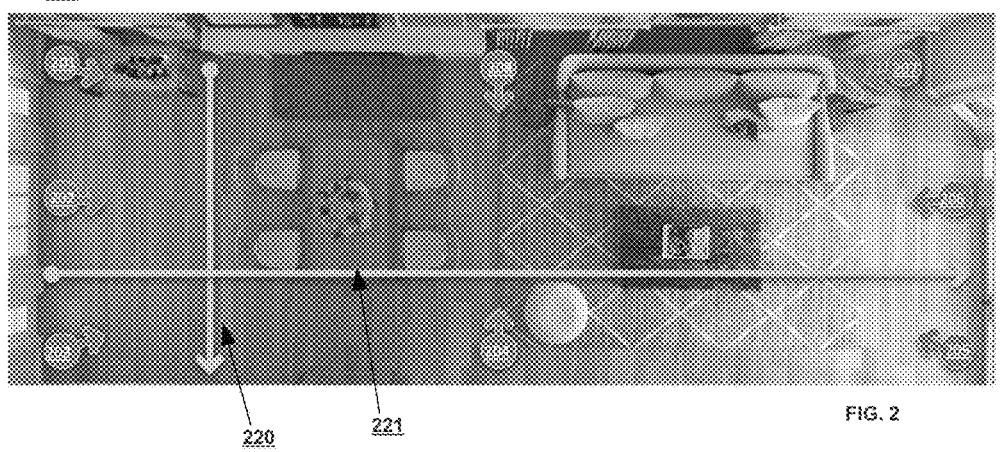
FIG. 2 depicts a room capture using the techniques described herein.

In some embodiments, the process of FIG. 1 may be simpler and quicker than known techniques while also being predictable and repeatable. Consider, for example, a single room being captured, depicted in FIG. 2. In some embodiments, a user (photographer), may follow an acquisition protocol in which a photo is taken in each corner and each wall midpoint, while always facing the center of the room (201-2018). Optionally, the dimensions of the room may be specified (220 and 221). Using the techniques herein, a 3D model of a room can typically be reconstructed based on eight to twelve photos depending on the complexity and shape of the room.

In some embodiments, the input images are plain RGB (red green blue) photos and there are minimal (or no) assumptions on the type of camera and lens used. In some embodiments, these plain RGB photos are called "flat images" and they do not have depth information (although they may have EXIF and other associated data). In some embodiments, input images can be taken with a cell phone camera, a point and shoot camera, a digital single lens reflect camera, another camera with a digital sensor. Additionally, the images may be scans from photographic prints. In some embodiments, focal length can be determined from the metadata of an image. If not, assuming a camera is a cell phone camera can imply the focal length in rare cases when it cannot be inferred from the image metadata. In some embodiments, there is at least a small amount of overlap among the photos ("limited overlap"). Image pairs can be "tied together" with just a single point correspondence per image, even for wide-baseline image pairs. This is described in more detail in section 5.3 and elsewhere herein.

Some embodiments assume that the scene is a residential, single-story space with a single-level floor; that it is a "relaxed" Manhattan-world scene where dominant lines in the scene are orthogonal, even while allowing non-orthogonal portions of the scene; that walls are vertical (whether or not the wall is angled).

In some embodiments, modeling 130 the indoor scene may include floor plan models and/or 3D models being determined or generated from the floor contours. The floor plans and/or 3D models may include data indicating openings representing doors and windows as discussed in more detail elsewhere herein.

Figure 3A:
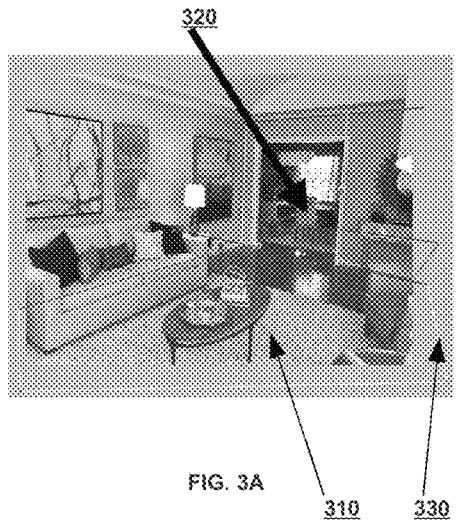
FIG. 3A and FIG. 3B depict examples of an adjacent spaces for modeled rooms.

Rooms or indoor scenes modeled 130 may also be optionally detailed 140. Detailing 140 of the model may include adding furniture and the like and will be performed using existing modeling software, and may be performed by a user or another party Not depicted in FIG. 1, some embodiments include reconstructing adjacent or secondary spaces. For example, rooms or hallways that are visible from the room being reconstructed may be considered an adjacent or secondary space. Reconstructing adjacent or secondary spaces can be beneficial for visualization purposes, as it can provide visual continuity through openings. See, for example, FIG. 3A and FIG. 3B depict an example of an adjacent space (320) for a modeled room (310).

4.0 Photo Labeling

Returning to FIG. 1, photos for labels may be received 110. These photos may be received from an interface in which a user is able to draw edges and floor polygons. These user-drawn edges and floor polygons may be reconstructed in 3D. Consider, for example, FIG. 3A and FIG. 3B, which depicts a single-view of an indoor scene. FIG. 3A may be used by the user to draw the floor polygons (330). In some embodiments, all vertices may be determined and reconstructed in 3D based on the drawn floor polygons (330). In some embodiments, the user may add a floor polygon as well as lines to indicate measurements (not depicted in FIG. 3A and FIG. 3B).

Figure 3B:
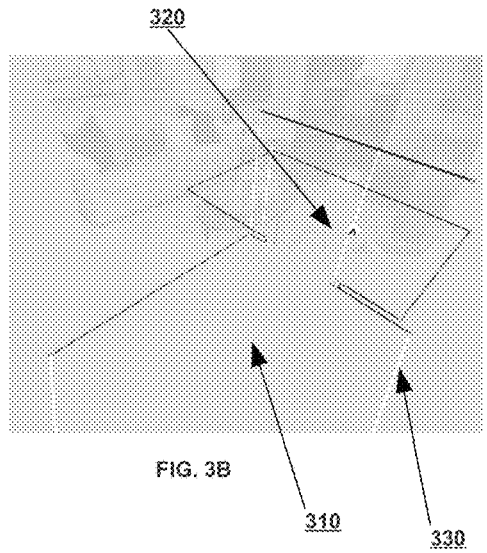

FIG. 3B depicts a 3D reconstruction of the labeled geometry. In some embodiments, a user can explore this 3D reconstruction in real-time or near real time by manipulating an orbiting virtual camera. As discussed above and elsewhere herein, in some embodiments, the secondary space 220 behind the doorway can be reconstructed based on the interpretation by the user of its dimensions of the secondary space 220.

Labeling of photos may take numerous forms, including vanishing point and line analysis, single-view reconstruction, and occlusion handling. These techniques are detailed below and elsewhere herein.

4.1 Vanishing Point and Line Analysis

As described elsewhere herein, some embodiments herein include vanishing point analysis. Based on automatically detected line segments, embodiments compute three orthogonal vanishing points using a random sample consensus (RANSAC)-based procedure under the Manhattan-world assumption and known camera calibration matrix. This may allow embodiments to proceed under the assumption that the most upward axis is assigned to the Y-direction, while the X an Z directions correspond to the vanishing points corresponding to a horizon line. In some embodiments that include display of the lines in a graphical user interface, when edges align with an axis, their color is set to red, green and blue for X, Y and Z, respectively, and yellow otherwise (not depicted in color in FIG. 3A and FIG. 3B).

In some embodiments, a user may override determined vanishing points. For example, if the user feels that that the vanishing point analysis did not produce an accurate enough result (e.g., due to furniture and clutter in the scene), then the user may opt to manually draw vanishing lines. In some embodiments, as the user draws a vanishing line, the system may update the vanishing points in real-time. In such embodiments, to visually gauge vanishing point quality, the mouse cursor is enhanced with crosshairs that extend across the full width and height of the image, which can be compared to structural edges in the photo (not depicted in FIG. 3A and FIG. 3B).

In some embodiments, the assumption that a calibration matrix K is known can be relaxed, notwithstanding that relaxed Manhattan-world constraints are assumed. This can be advantageous when jointly estimating K and vanishing points comes with undue computational cost and/or reduced accuracy. The assumption may include K depending on the focal length, zero skew, a pixel aspect ratio equal to one, and the principal point as the image center. Focal length can often be obtained from the image metadata (e.g., its EXIF tags). If focal length is missing, matrix K can be initialized assuming the horizontal field-of-view (FOV) is 60 degrees. In some embodiments, assuming FOV is 60 degrees can be beneficial because FOV in more than 80% of input images have been seen to be within 2° FOV of 60 degrees. Further, once the vanishing points have been computed, matrix K can be refined.

4.2 Single-View Reconstruction

In some embodiments, after the vanishing point analysis, the techniques proceed by performing single-view reconstruction, which may begin with reconstructing vertex positions. For example, the techniques may use a pinhole imaging model to map scene point X onto an image position y using the following equation:

$$y=KR(x-c),$$

where, x and y are 3×1 vectors with y a 2D image position in homogeneous coordinates. K is the 3×3 calibration matrix (discussed elsewhere herein), R is a 3×3 rotation matrix and c is the camera position as a 3×1 vector.

In some embodiments, given matrix K computed using the method described above, the rotation matrix R represents the camera orientation with respect to the dominant scene axes. The camera position may initially be assumed to be equal to $(0,0,0)^T$. Then the height of the camera will be equal to $-Y_{fp}$, where $Y_{fp}$ is the coordinate along the vertical world axis (i.e. the Y axis) of the reconstructed horizontal floor polygon. Computing accurate camera positions along the X and Z axes is discussed in Section 5 and elsewhere herein.

Consider an example in which N vertices in an image that make up lines and polygons drawn by the user. Each one has a known 2D image location v for which a ray direction r can be computed:

$$r=R^T K^{-1} v$$

Any reconstructed point x must lie on this ray, which can be equated as a cross product r×x=0. Some embodiments rely on the assumption that last and following equations that a zero on the right-hand side becomes a zero-filled column vector of length equal to the number of rows on the left-hand side. Equivalently, $[r]_x x=0$ where the bracket operator converts r into a 3×3 skew symmetric matrix to represent the cross product as a matrix multiplication. Let A be a (3N)× (3N) block-diagonal matrix representing all ray-vertex cross product matrix multiplications:

$$Au=0$$

Where all vertex positions have been concatenated into a (3N)×1 vector u. This is a linear homogeneous system, where u can be computed as the eigenvector corresponding to the smallest eigenvalue of $A^T A$. However, the solution is severely under-constrained problem and does not encode any structural information since any vertex can "move" freely and independently along each ray while satisfying the cross-product equations. To constrain the problem, the geometric constraint matrix G, which encodes pair-wise relationships as equalities based on the labeled geometry. In one embodiment, we can use G to encode equalities like:

Vertices sharing an oriented edge must have two equal coordinates, and

Vertices lying on an oriented polygon must have one equal coordinate.

Other embodiments may include any variation of such equalities between vertex coordinates, regardless of the presence of polygons and edges. For instance, in the same way we can define collinearity of two or more vertices, or coplanarity of two or more vertices.

As used herein "oriented" is a broad term encompassing numerous meanings, including that the direction aligns with one of the three vanishing points. In some embodiments, orientations may be integer labels in 1 . . . 3, corresponding to axes X, Y and Z, respectively, which are obtained via snapping-to-axis (see section 4.3) or manual labeling. These coordinate equalities suggest that the stacked coordinates in u must have many redundant entries, thereby reducing the dimensionality of the problem and constraining the solution space. For instance, considered reconstructing two vertices with coordinates $(a, b, c)^T$ and $(d, e, f)^T$ that share an edge along the X-direction. Then b=e and c=f, essentially reducing the number of unknowns from six to four. This works in some embodiments since such an edge in inherently parameterized by four parameters: two to indicate start and end position along the X-axis and two to indicate the position on the YZ-plane. As another example consider a polygon whose normal aligns with Y, consisting of vertices v[1], v[2], v[3], and a vertex v[4] that is constrained to lie on the polygon. Based on that assumption, the Y-coordinates of vertices v[1 . . . 4] will all be equal.

In some embodiments, to compute G for arbitrary lines and polygons, a (3N)×(3N) equality matrix E is constructed such that E(i,j) is equal to one when the $i^{th}$ and $j^{th}$ coordinate in vector u are equal, and zero elsewhere. E represents an equality graph, in which M connected components (or clusters) represent groups of equal unknowns. Then the (3N)×M matrix G is constructed such that an M×1 variable vector w maps to a (3N)×1 coordinate vector u:

$$u=Gw$$

In some embodiments, each column of G contains a binary representation of cluster membership, such that right-hand side multiplication duplicates the entries of w accordingly. The linear system can be rewritten to solve for a lower dimensional vector w as follows:

$$AGw=0$$

whose solution is equal to the smallest eigenvector of $G^T A^T AG$, and can be solved in real-time. In some embodiments, when there are isolated vertices not connected to any oriented geometry, the solution may still be ambiguous (e.g. more than one zero eigenvalue). Or similarly, the reconstruction of two connected components may each correspond to a separate eigenvector. To avoid any ambiguities, some embodiments run a connected component clustering on the edge graph and only reconstruct the largest one, or the one that is connected to the floor polygon. In some embodiments, the connected component clustering used here may be different from the connected component clustering mentioned in the previous paragraph.

In some embodiments, solving for vertex positions under geometric constraints is avoided when mixing hard and soft constraints would result in a more complicated problem formulation. For example, solving a problem of form "Ax=b" subject to equations of the form Cx=q can require multiple steps to obtain a solution (factorization+two least squares). Some embodiments avoid this by encoding hard constraints that are all absorbed into the left hand-side of a homogenous linear system.

4.3 Occlusion Handling

Figure 4A:
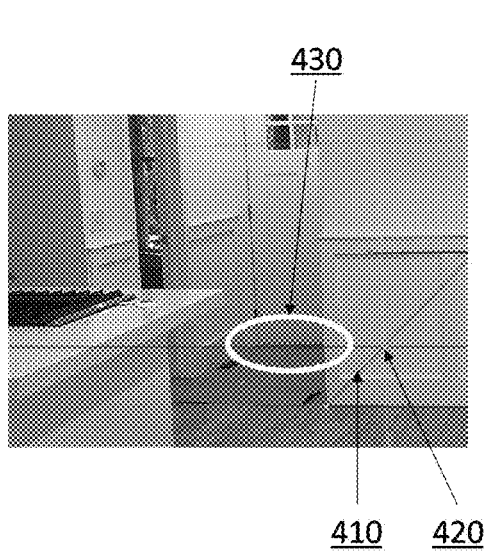
FIG. 4A and FIG. 4B depict user interfaces with control elements.
Figure 4B:
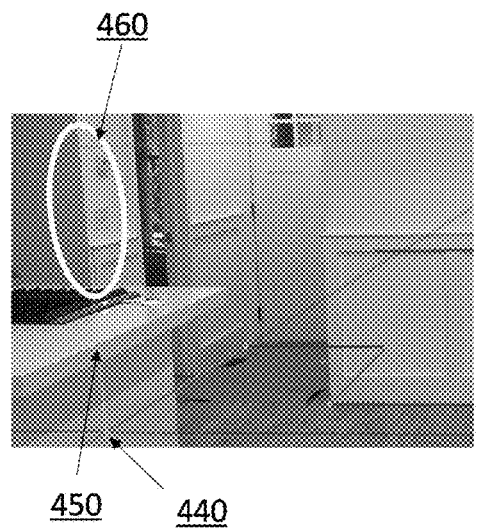

In some embodiments, a labeling interface can be used to draw floor contours in the presence of occlusion. This can be beneficial when occlusion of the floor contours occurs frequently due to the presence of furniture, etc. Two aspects of the user interface are particularly useful for this, snap-to-axis and 3D crosshairs elements. In some embodiments, with the snap-to-axis element, edges are automatically snapped to one of the major axes corresponding to the "closest" vanishing point while drawing the floor polygon. As described elsewhere herein, the major axes may be determined from the angle between the 2D direction to any vanishing point and the edge direction. In some embodiments, no orientation is forced or enforced if the angle exceeds a threshold. In some embodiments, the 3D crosshairs element is a cursor enhanced with 3D lines that run across the entire image, one for each axial direction. FIG. 4A depicts that when drawing the occluded face of the wall, the cursor can be guided along the X-axis (410) to where the Z-crosshair line (420) aligns with the side of the door (430). FIG. 4B depicts a kitchen island occluding an important corner. In some embodiments, in the user interface, the corresponding vertex along the X-axis (440) is placed such that the vertical line (450) aligns with the corner edge (460).

5 Floor Plan Construction

In some embodiments, the techniques proceed by determining floor plans. Determining the floor plan can accomplish both camera position estimation in the 3D world space and floor plan part alignment. In some embodiments, before the parts are aligned, their dimensions should be adjusted or corrected.

5.1 Scaling to Absolute Units

In some embodiments, the scale of the solution u is determined by the unit-length scaling of the eigenvector w. It may be useful not only to rescale it to real-world measurements, but also to normalize the parts' scale across the different views to facilitate proper alignment. Some embodiments accomplish this by instructing the user to establish two types of length constraints: absolute and equalities. "Absolute" length constraints have a broad meaning, including that uses can indicate objects and distances of known size. For example, most doors in the US have a standard height of 80". Other example reference lengths are: door knob heights (36"), kitchen counter heights (36"), electrical outlet plates (4.5" along its vertical dimension). In some embodiments, to indicate an absolute length constraint, the user draws a vertical line from the polygon with reference to the known measurement. "Equality" length constraints refer to a broad class of measurement and include, even when edge lengths are not known, they can be used to state equalities across views. For example, a vertical line from the floor polygon edge to the ceiling can be easily drawn in most photos. It may be assumed in some embodiments that the ceiling height is equivalent throughout the room. If the ceiling is not visible, the window heights may be defined by reference in a similar manner. FIG. 5 depicts that the average height of camera (510) and ceiling (520) being used for scale.

In some embodiments, the network of equalities results in a system of equations. Let s[1 . . . N] be the vector of unknown scaling factors with s[i] the factor of the $i^{th}$ view. Assume that there is at most one equality between two different views i and j, the reconstructed lengths of the same line from the unscaled solution as $l_i$ and $l_j$ in the respective views can be computer, obtaining an equation:

$$s[i] = \frac{l_i}{l_j} s[j] = f_{ij} s[j]$$

Absolute constraints may form equations $s[i]=l_i$. In some embodiments, after applying natural the logarithm, these equations can be rearranged with the log $f_{ij}$-terms and log $l_i$-terms to the right-hand side and the s[i] terms on the left, yielding a linear system of the form Ax=b. This formulation minimizes the squared differences in logarithmic units rather than actual units, which can provide efficiencies. When views share more than one equality, average the corresponding $f_{ij}$-factors may be used. In some embodiments, this system may be under-constrained when equalities or absolute lengths are missing. To determine whether this is the case, a view graph can be constructed where the nodes are views and each equality defines an edge. Then each connected component in this graph may contain at least one absolute length constraint. For example, this condition could be fulfilled by having no equalities but an absolute length in each view. In some embodiments and/or input sets, there are enough equalities to obtain a single connected component and exactly one absolute length in one view.

In some embodiments, an initial approximate scale can be computed without length constraints. This can be useful to automatically suggest length constraints when edges have similar lengths in different views or if an edge is close to a standard length (as described elsewhere herein). The embodiments may use, for example, the observation that photographs are usually taken at the same height. For example, photographs taken by the same person will usually be taken at roughly the same height, especially if they are taken with the same camera. Further, specific camera types may often take pictures at the same height. For example, based on roughly 100 reconstruction examples based on cell phone photos, a median height H=1.45 m (see FIG. 5) was found. Therefore, based on this assumption, the reconstruction can accordingly. Further to that example, when drawing ceiling polygons, the vertical distance D between the camera and the ceiling can be assumed to be D=2.50 m−H=1.05 m, based on the median ceiling height observed in the same reconstruction examples.

5.2 Alignment of Floor Plan Parts

In various embodiments, floor plans can be aligned automatically and/or the user can align the floor plans manually. In embodiments where the floor plans can be aligned manually, the user can translate and rotate the parts into place. In some embodiments, resizing may be unnecessary when performed using the methods described elsewhere herein.

FIG. 6A and FIG. 6B depict user interfaces for manually aligning floor plan parts. In FIG. 6A depicts an interface to manually align parts in which the user can select, move and rotate floor plan parts (607, 608, and 609). In some embodiments, a box (610) representing user-supplied dimensions can be used as a reference. Point correspondences may be indicated as numbers and guide the user. FIG. 6B shows the result of alignment where point correspondences coincide.

Embodiments with automatic alignment include resolving rotation ambiguities among views and determining relative translation between views (for example, aligning the parts). Alignment of the floor plan parts, be it performed manually by the user or automatic using the methods described elsewhere herein, takes place in 2D. The resulting alignment of the parts and the determination of relative translation between views' camera positions extends from 2D to 3D, based on the insight that the floor polygons must all reside on the same level in 3D space, while the camera heights are known from the 3D single-view reconstruction as described elsewhere herein. More precisely, the floor plan part alignment results in offsets vectors for each view position in the XZ plane, while the associated Y coordinates can be set using the camera height computed using the method described herein.

In some embodiments, alignment of floor plane parts can include resolving ambiguities. Rotation matrices may have been estimated from vanishing points, as described elsewhere herein. Ambiguity may remain when comparing rotations between views. This may occur, for example, when relative rotation cannot be uniquely determined from vanishing points alone. Consider a 48-fold ambiguity: given that axes between views can be permuted 3!=6 ways and multiplied by 1 or −1. This results in 6×2³=48 possible relative rotations, of which 24 keep determinant one. If the Y-vanishing point is constrained to be vertical, only four cases remain: 2!=2 permutations and a multiplication of both X and Z axes by 1 or −1. These cases may correspond to 90-degree incremented rotations (or flips) around the Y-axis. FIGS. 7A and 7B depict two adjacent views looking at two corners of the same wall. Note that the bookshelf (710) in 7A is the same bookshelf (710) as in 7B. FIG. 7C depicts four possible orientation or flips for floor plan part A. The options (721-723) are not desirable, while the orientation 720 looking toward the top-left direction is consistent with the orientation of the second part B shown in FIG. 7D.

FIG. 8A, FIG. 8B, FIG. 8C, FIG. 8D, FIG. 8E, FIG. 8F depict point correspondences in an indoor scene. In FIG. 8A and FIG. 8B, point correspondences 801 indicate vertices that correspond to the same corner in the indoor scene. In FIG. 8C, FIG. 8D, FIG. 8E, FIG. 8F, correspondence 801 indicates a position on the floor that is aligned with a reference point on the wall (outlet). In some embodiments, a user can accurately align the position by looking at the vertical axis 810 positioned to pass through the outlet in FIG. 8C and FIG. 8D. Point on the floor can be aligned via either or both the of the other axes (820, 830). For example, in FIG. 8E, axis 830 can be used to align a second correspondence 802 with the vent and place the same correspondence 802 in view of FIG. 8D.

FIG. 9A, FIG. 9B, FIG. 9C depict resolution of rotational ambiguity. Consider the images depicted in FIG. 7. There may be two (out of four) possible rotations (flips) for part A depicted in FIG. 9A and FIG. 9B. If there is an indicated point correspondence 901 on the right-hand side of the floor polygon in input image from FIG. 7A (not depicted in FIG. 7A), then it would be correspondence 901 in FIG. 9A, FIG. 9B, FIG. 9C. The local edge direction, given the polygon's counter-clockwise winding, can be compared to the same direction on the contour of part B in FIG. 9C. For example, the local direction (depicted as an arrow emanating from correspondence 901) differs by ninety degrees between FIG. 9A and FIG. 9C and zero degrees between FIG. 9B and FIG. 9C. This leads to the determination that the orientation or flip depicted in FIG. 9B properly corresponds to FIG. 9C.

Returning again to an example in which it is determined that there is ambiguity in the flip or orientation, to resolve the ambiguity, in some embodiments, the user can provide input to resolve the ambiguity. For example, the user may draw point correspondences to indicate how floor plan parts relate to each other spatially (see, e.g., FIG. 4A, 4B, and related discussion and elsewhere herein). If a correspondence point lies on the floor polygon's contour, either coinciding with a vertex or lying on an edge, then then the polygon's winding direction (e.g., counter-clockwise) can be used to compute the relative difference in angular degrees among all four possible flips, as shown in FIG. 9A, FIG. 9B, FIG. 9C. in some embodiments, floor- or wall-bound locations can be marked on a polygon edge by aligning it using the axial crosshairs (see, for example, FIG. 8C, FIG. 8D, FIG. 8E, FIG. 8F and related discussion and elsewhere herein).

In some embodiments, correspondences can be placed at vertices and/or in the polygon interior. If there is ambiguous local direction (as discussed elsewhere herein), then at least two point correspondences are required between views to uniquely determine the flip or orientation of the photos relative to one another. In some embodiments, this may require off-surface locations using line constructions. For example, to indicate a particular spot on a dresser, a vertical line toward the floor may be rendered over the dresser, and that line might be related to a feature (e.g., a contour) on the dresser.

Figure 10:
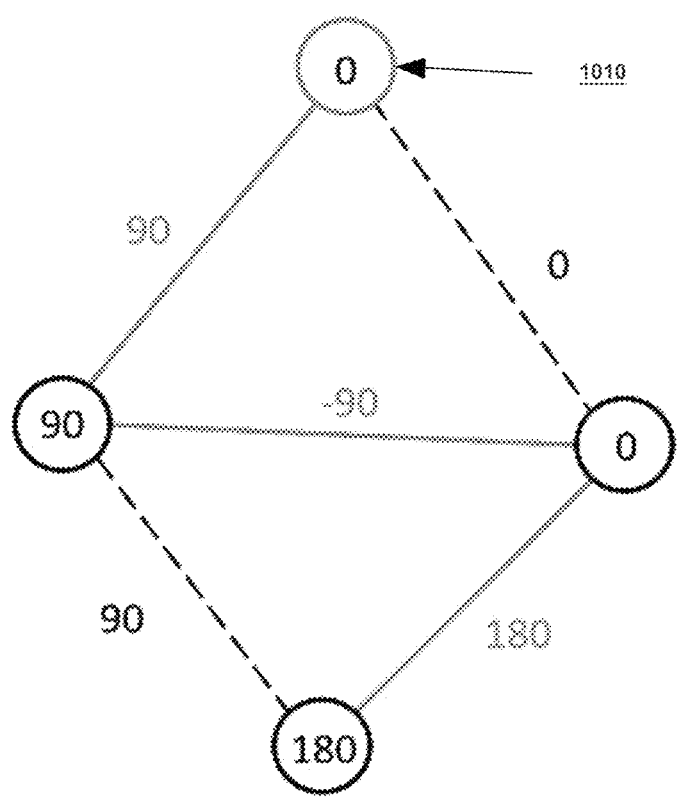
FIG. 10 depicts orientation flips in N views.

As noted, with two point correspondences, a determination can now be made with respect to the orientation or flip that resolves the relative orientation between two views. In some embodiments, these two point correspondences can also be used to resolve flip or orientation ambiguities across N views by, in part constructing a view graph (see, e.g., FIG. 10 and elsewhere herein). For each pair of views sharing at least one correspondence, an edge is defined in the view graph with weight equal to the relative rotation difference. A determination of the final flipping angles (e.g. numbers depicted inside the nodes of FIG. 10) may be made by spanning a tree (solid lines) from a random starting node 1010 with the assumption that it does not require flipping. In some embodiments, there are four possible flip states: 0, −90, 90 and 180 (degrees). The tree may be traversed in depth-first order and the flip states are incrementally updated. In some embodiments, the view graph must consist of a single connected component spanning all views in order to resolve ambiguities. In some embodiments, the techniques include informing a user of any missing point correspondences, such that the user may complete the view graph to arrive at a single connected component.

In various embodiments, the techniques proceed by aligning floor plan parts. Based on the above, rotations may have been made consistent across views. Reconstructed vertex positions in a view i can be interpreted as offset vectors to the corresponding view position c[i]. Consider two corresponding vertices with reconstructed positions $p_i$ and $q_i$ in two views i and j, respectively. Based on the above, the world-space position must be equal:

$$c[i]+p_i=c[j]+p_j \Leftrightarrow c[i]-c[j]=q_j-p\_i$$

Figures 11A, 11B:
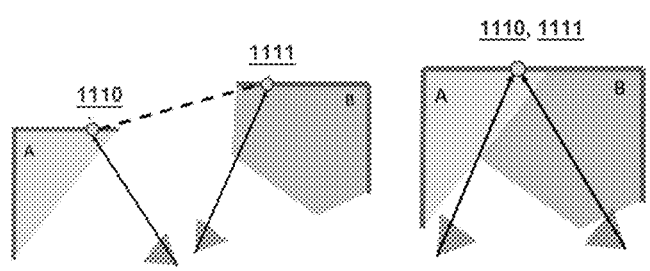
FIG. 11A and FIG. 11B depict floor plan part alignment.

FIG. 11A depicts that two floor plan parts A and B can be aligned by minimizing the distance between corresponding vertex positions 1110 and 1111. For N views, this distance is minimized for all distances among corresponding points/vertices. FIG. 11B depicts the simultaneous alignment of the floor plan parts and resolution of the relative view positions (indicated as triangles in FIG. 11A and FIG. 11B).

In some embodiments, the techniques can be used for each of a total of Q point correspondences, which can be encoded in an (2Q)×(2N) matrix resulting a linear problem of the form Ax=b where x is the stacked vector derived from all unknown view positions c[1 . . . N] and the right-hand side corresponds to the difference vectors $q_i$–$p_j$ (where, e.g., q is 1110 and p is point 1111 in FIG. 11A). These embodiments solve across all N views to minimize the sum of squared distances between all p's and q's. The "connectedness" criterion in the view graph used to solve the rotation flips may ensure that this system is constrained. However, in some embodiments, two degrees of freedom may remain because the solution is only determined up to an offset. For example, the entire solution may not be found without affecting the sum of squared distances. One solution to this issue, in some embodiments, is to either fix one the positions to $(0,0)^T$ or to regularize the solution (e.g. with truncated singular value decomposition (SVD)).

5.3 Floor Plan Tracing

In some embodiments, once all floor plan parts have been aligned the user can trace the final contour of the floor plan using a graphical user interface, which may include the user drawing a polygon on top of the aligned parts. The user may either choose to snap to vertices of the existing parts or to draw vertices freely. The latter can be advantageous as it may allow the user to add plausible corners that might not be visible in the pictures. The floor part alignment minimizes distances between corresponding vertex positions, but the optimization is global. If there may be a non-zero residual distance, then slight misalignment may occur. For example, if a user traces a horizontal or vertical wall by snapping to vertices of misaligned parts, this wall may become angled as a result. Or in other words, right angles will not be 90 degrees anymore. In some embodiments, therefore, the vertices are rectified such that right angles remain 90 degrees, while minimizing the distance to the connected vertices as follows. For example, the user may draw a closed polygon, while the system remembers which vertices have been referenced. Each polygon edge may be classified according to the axial directions (X or Z) incident at these vertices as defined using the photo labeling methods described elsewhere herein. Polygon edges not adjacent to such vertices are classified by to the closest axis, X or Z, by checking whether the angle w.r.t. said axes is below a threshold. Upon completion, the vertex positions may be rectified using a geometric constraint matrix G that is computed in a manner similar to the method described in section 4 and elsewhere herein:

$$v'=GG^*v$$

where, v and v' are (2T)×1 vectors representing the T stacked vertex positions of the final floor polygon, initial and rectified, respectively. Matrix G* may be the Moore-Penrose pseudoinverse of G. Note that G* can be computed by rescaling each row of $G^T$ to sum to one based on the observation that $G^TG$ is a diagonal matrix with column-sums of G as diagonal elements. Any off-diagonal dot products that make up $G^TG$ are always zero because the binary membership vectors in each column may be disjoint. In some embodiments, this has the effect of projecting v onto the subspace of "rectified" polygons, while the multiplication by G projects it back.

6.0 Functional Overview

Figure 12:
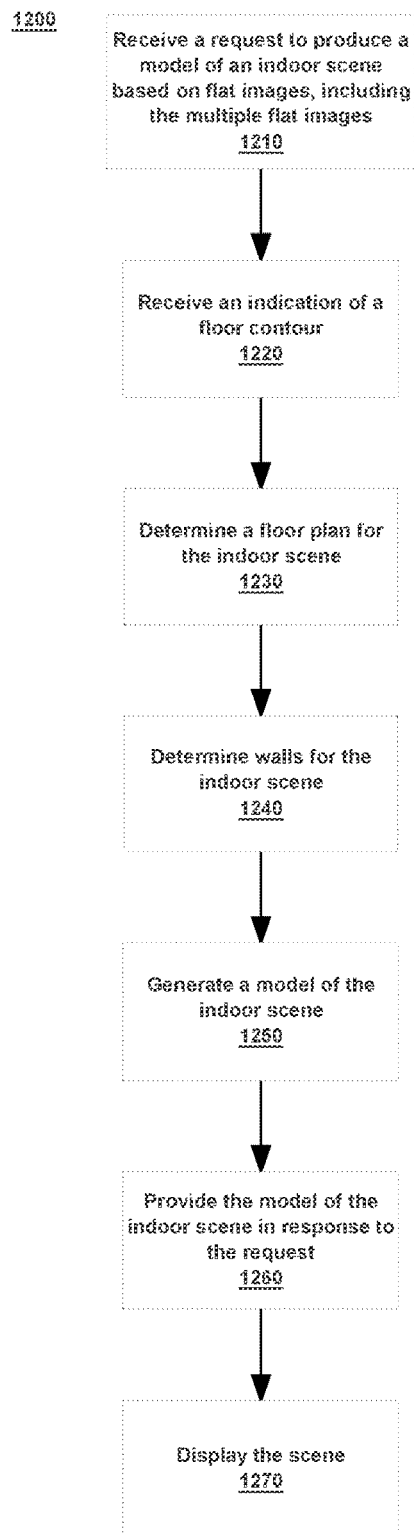
FIG. 12 depicts a second process for modeling indoor scenes based on digital images.

FIG. 12 depicts an example process 1200 for modeling indoor scenes based on digital images. Numerous aspects, blocks, and functionality that will be described with respect to FIG. 12 are discussed additionally elsewhere herein.

Process 1200 proceeds by receiving 1210 a request to produce a model for an indoor scene based on multiple flat images. As discussed elsewhere herein, flat images may be images without "Z" or depth information, but may have color, EXIF and other data included or therewith associated. The request may be received from any appropriate process or machine, such as requestor 1320, and it may be received via network 1390. As described elsewhere herein, the flat images may number in the single or double digits, though more input images are possible.

Once the request is received 1210, an indication of a floor contour may be received 1220. As described elsewhere here, the floor contour may have been determined by a user and/or automatically using the techniques described herein. For example, the floor contour may be determined by first determining or receiving indication of one or more vanishing points in the indoor scene (described in Section 4.1 and elsewhere herein), determining a single-view reconstruction (described in Section 4.2 and elsewhere herein), and occlusion analysis and/or handling (described in Section 4.3 and elsewhere herein).

A floor plan can be determined 1230 for the indoor scene. As described elsewhere herein, the floor plan may be determined 1230 based on the floor contour and/or other aspects of the photos labels (described in Section 5 and elsewhere herein). For example, the determination of floorplan may include determining scaling (absolute and/or relative), alignment of floor plan parts, and/or floor plan tracing. Each of these is described elsewhere herein.

In some embodiments, walls can be extruded or determined 1240 based on the floor plan. As discussed in detail elsewhere herein the walls may be assumed to be orthogonal to the floor and may be extruded or determined based on the floor contour (e.g., each edge of the floor contour may be assumed or determined to be a wall). In some embodiments, and as discussed in Section 3.3 and elsewhere herein, indications of doors and windows may also be received for the walls, and included in the later-determined model.

A model of the indoor scene may be determined 1250 based on the floor plan and the walls. For example, as described elsewhere herein, a 3D model of the scene may be determined based on the floorplan and the walls (e.g., creating a 3D space representing the indoor space). Further, the flat photos from which the model was made may also be used to provide color and/or texture maps for the scene. For example, the input photos may be projected onto the polygons (floor, wall, ceiling, etc.) to provide texture maps for those polygons. In some embodiments, the model of the indoor scene is purely a floor plan, and the walls may not be used to determine the model. Embodiments of this are described in Section 3.3 and elsewhere herein.

The model may be provided 1260 back to the original requestor and/or may be (optionally) displayed 1270. Displaying the model may include rendering the model on a display, rending stereoscopic views of the model in a head-mounted or other 3D display, and the like. In some embodiments, the model may be displayed for use in interior design, architecture, real estate, consumer room planning (including furniture purchase), and the like. In some embodiments, better informed purchasing decisions may be based on consumers viewing the indoor models made using the techniques herein. For example, based on a few photographs that a user brings into a store, a model of a room can be made, and furniture or other interior design choices can be made (e.g., virtually placing furniture, lamps, curtains, etc. in the modeled room) while still in the store with drastically better knowledge of how things will look. As another example, an architect can quickly make a 3D model of a room based on flat photos using the techniques herein, and show how addition or removal of walls and/or changing windows or door would look to a potential customer.

Figure 15:
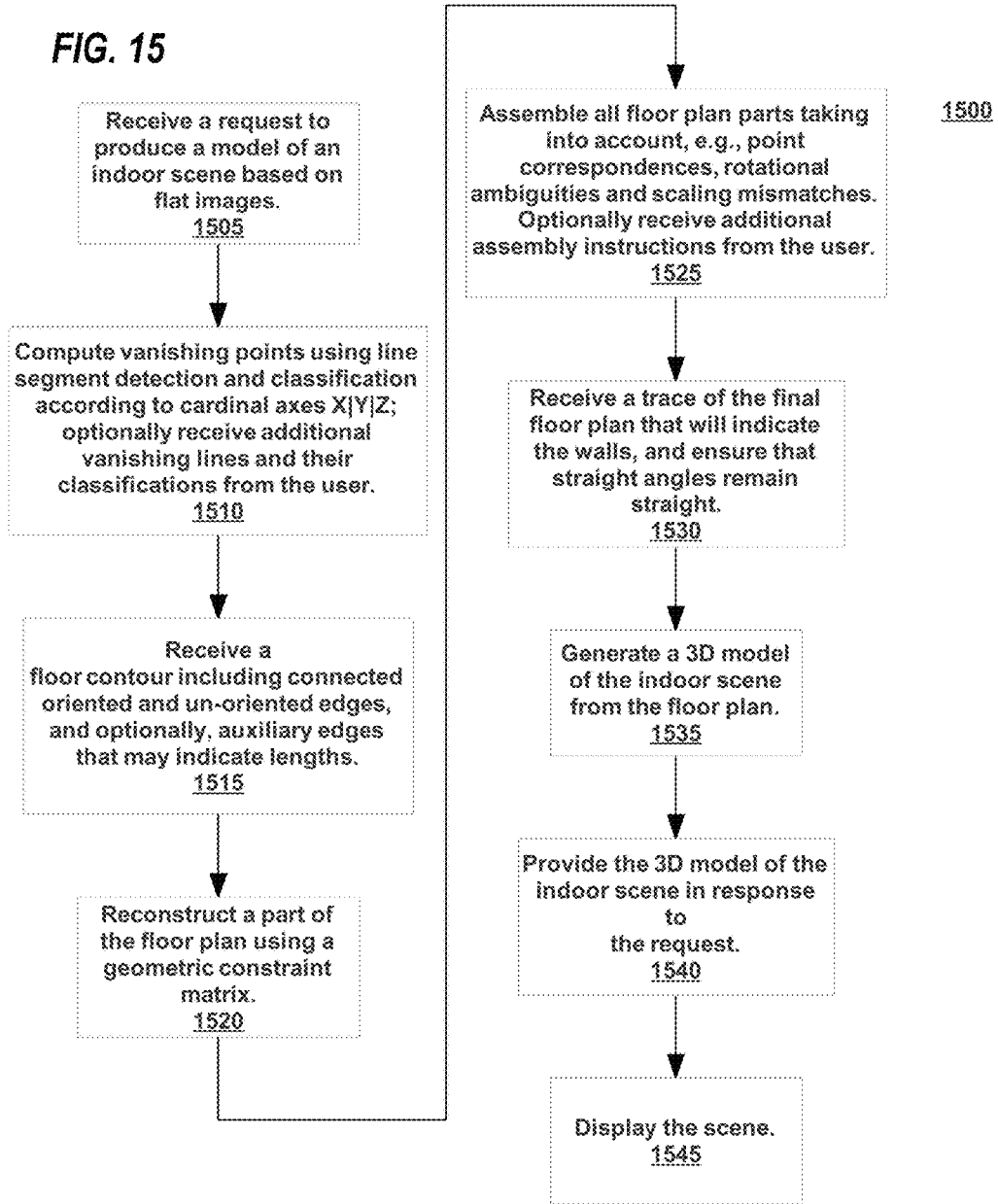
FIG. 15 depicts a third process for modeling indoor scenes based on digital images.

FIG. 15 depicts an example process 1500 for modeling indoor scenes based on digital images. Numerous aspects, blocks, and functionality that will be described with respect to FIG. 12 are discussed additionally elsewhere herein.

Process 1500 proceeds by receiving 1505 a request to produce a model for an indoor scene based on multiple flat images. As described elsewhere herein and with receiving 1210, the multiple flat images may be images without depth information, but may have color, EXIF and other data included or therewith associated. Even if there were depth information included in or therewith associated, as described herein, such depth information may not be used with the techniques herein, thereby using the images as "flat" images. The request may be received from any appropriate process or machine, such as requestor 1320, and it may be received via network 1390. The flat images may number in the single or double digits, and the techniques herein may also be used with larger sets of flat images.

Vanishing points for the multiple flat images may be computed 1510. As described elsewhere herein, the vanishing points may be computed using line segment detection and classification according to the cardinal axes X, Y, and Z, by, for example, model creation system 1310. In some embodiments, the user may input additional vanishing lines and their classifications. This is described elsewhere herein.

The process 1500 proceeds by receiving 1515 a floor contour with both oriented and un-oriented edges. The floor contour edges may be generated on a user interface by a user or may be generated automatically, e.g., by model creation system 1310. In some embodiments, auxiliary edges in the floor contour may indicate lengths. Aspects of these are described elsewhere herein.

Based on the received floor contour edges, a part of the floor plan is reconstructed 1520 using a geometric constraint matrix. This is described elsewhere herein, and may be performed multiple times to construct multiple floor plan parts, and may be performed by model creation system 1310. The floor plan parts are then aligned 1525. In some embodiments, model creation system 1310 aligns the floor plan parts. Aligning 1525 all the floor plan parts may include, as described elsewhere herein, accounting for point correspondences, rotational ambiguities, and scaling mismatches. In some embodiments, a user may provide alignment instructions to help aid floor plan reconstruction 1520.

A trace (or outline) of the final floor plan is received 1530, and that trace of the final floor plan indicates the walls, and right angles remain ninety degrees. The model creation system 1310 may receive the final floor plan. As discussed elsewhere herein, the received 1530 floor plan trace or outline may have been made by the user using a user interface. The 3D model for the indoor scene is generated 1535 based on the floor plan. In some embodiments, the model creation system 1310 may generate the 3D model using techniques discussed elsewhere herein.

The generated model of the indoor scene is provided 1540 in response to the original request 1505 and, in some embodiments, the model of the indoor scene may be displayed 1545 (e.g., on a graphical user interface or a head-mounted display). The model creation system 1310 may provide the model to the receiver/requester 1320. Providing the model in response to the request and displaying the model are discussed elsewhere herein.

As discussed herein the various processes 100, 1200, 1500, etc. may run in parallel, in conjunction, together, and/or one process may be a subprocess of another. Further, any of the processes may run on the systems or hardware discussed herein. Further, each may fun on system depicted in and described with respect to FIG. 13 and FIG. 14.

7.0 Example Systems

Figure 13:
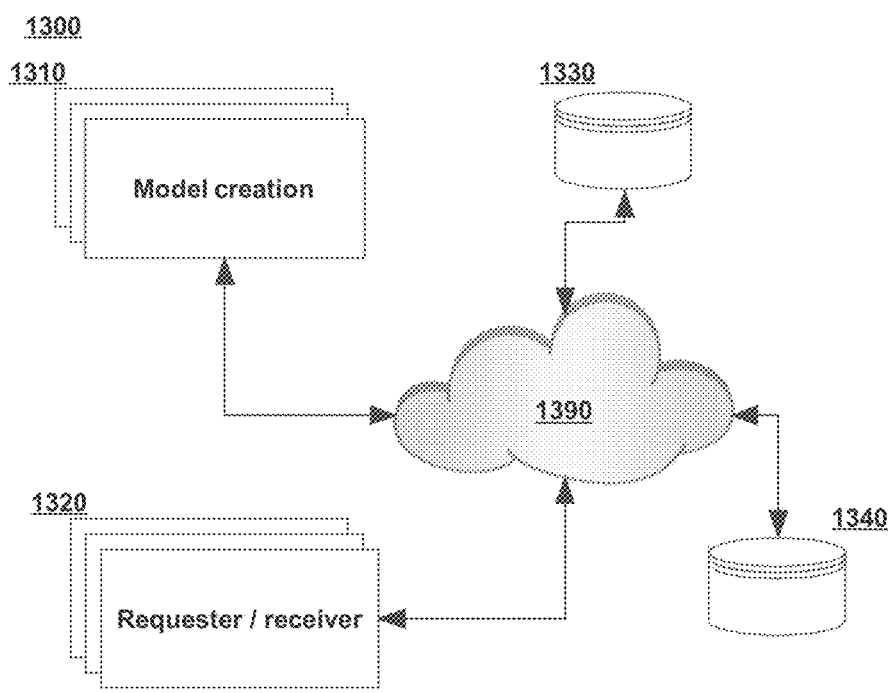
FIG. 13 depicts an example system for modeling indoor scenes based on digital images.

FIG. 13 depicts an example system for modeling indoor scenes based on digital images. System 1300 includes elements connected by a communicative coupling or network 1390. Examples of communicative coupling and networks are described elsewhere herein. In some embodiments, the processes 100, 1200, and 1500 of FIG. 1, FIG. 12, and FIG. 15 may run on the system 1300 of FIG. 13 and/or the hardware 1400 of FIG. 14. For example, the described functions of process 100 and/or process 1200 may be performed by model creation system 1310 (and/or requestor/receiver system 1320). The selected, determined floor plans and models might be stored at model creation system 1310, requestor/receiver system 1320 and/or communicatively coupled storage 1330 or 1340. A requestor/receiver system 1320 may view the models or plans produced by processes 100 and/or 1200.

Each of model creation system 1310 and requestor/receiver system 1320 may run on a single computing device, multiple computing devices, in a distributed manner across a network, on one or more virtual machines, which themselves run on one or more computing devices. In some embodiments, model creation system 1310 and requestor/receiver system 1320 are distinct sets of processes running on distinct sets of computing devices. In other embodiments, model creation system 1310 and requestor/receiver system 1320 are intertwined or share processes or functions and/or run on the same computing devices. In some embodiments, storage 1330 and 1340 are communicatively coupled to model creation system 1310 and requestor/receiver system 1320 via a network 1390 or other connection. Storage 1330 and 1340 may also be part of or integrated with model creation system 1310 and/or requestor/receiver system 1320 via a network 1390 or other connection.

8.0 Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
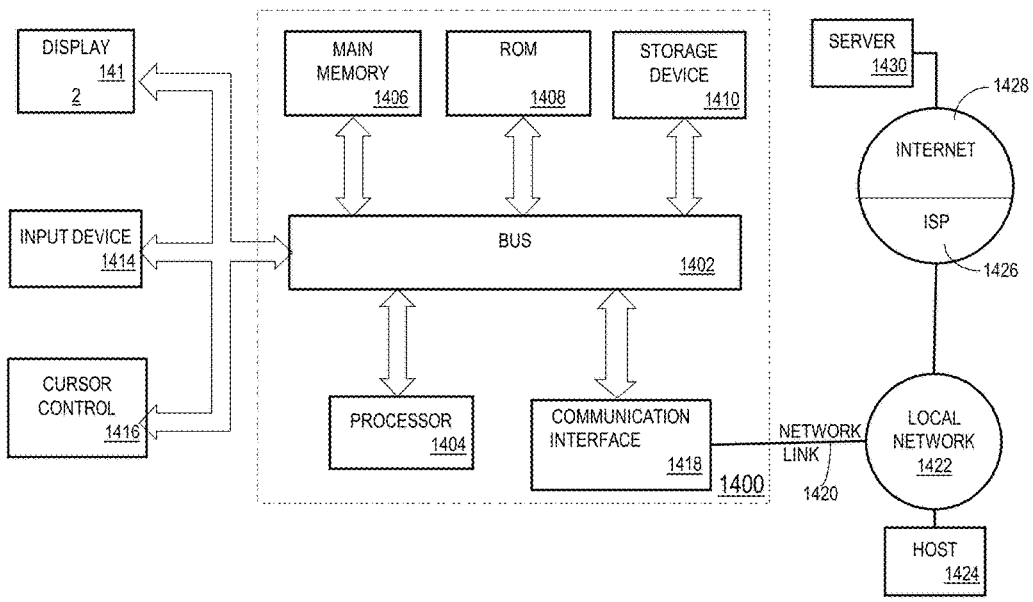
FIG. 14 is a block diagram that illustrates a computer system upon which an embodiment of the invention may be implemented.

For example, FIG. 14 is a block diagram that illustrates a computer system 1400 upon which an embodiment of the invention may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk, optical disk, or solid-state drive is provided and coupled to bus 1402 for storing information and instructions.

Computer system 1400 may be coupled via bus 1402 to a display 1412, such as an OLED, LED or cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane. The input device 1414 may also have multiple input modalities, such as multiple 2-axes controllers, and/or input buttons or keyboard. This allows a user to input along more than two dimensions simultaneously and/or control the input of more than one type of action.

Computer system 1400 may implement the techniques described herein using customized hard-wired logic, one or more ASICs or FPGAs, firmware and/or program logic which in combination with the computer system causes or programs computer system 1400 to be a special-purpose machine. According to some embodiments, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1410. Volatile media includes dynamic memory, such as main memory 1406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid-state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information. Such a wireless link could be a Bluetooth, Bluetooth Low Energy (BLE), 802.11 WiFi connection, or the like.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
   one or more computing devices;
   memory; and
   one or more computer programs stored in the memory for execution by the one or more computing devices, the one or more computer programs comprising instructions configured for:
   receiving a request to produce a 3D model of an indoor scene based on multiple flat images of the indoor scene, wherein the multiple flat images of the indoor scene obey no more than a limited overlap requirement, are absent of depth information, and are taken from one or more viewpoints;
   determining vanishing points in the multiple flat images;
   receiving floor contour information, wherein the floor contour information consists of polygons, edges, and vertices determined based at least in part on the vanishing points;
   reconstructing, using a geometric constraint matrix which encodes coordinate equalities among said vertices, 3D vertex positions of two or more floor plan parts based at least in part on the floor contour information;
   determining a combined floor plan based at least in part on aligning the two or more floor plan parts, received length information, wherein the length information contains lengths of edges and groupings of edges of equal length, and received point correspondence information, wherein the point correspondence information indicates corresponding vertices among different images;
   receiving floor plan outline information, wherein the floor plan outline information indicates walls in the indoor scene and was determined based at least in part on the combined floor plan; and
   generating the 3D model of the indoor scene based at least in part on the floor plan outline information.

2. The system of claim 1, wherein the one or more computer programs stored in the memory for execution by the one or more computing devices are further configured for determining vanishing points in the multiple flat images using line segment detection and classification according to cardinal axes X, Y and Z.

3. The system of claim 1, wherein the one or more computer programs stored in the memory for execution by the one or more computing devices are further configured for aligning the two or more floor plan parts based at least in part on point correspondences among the two or more floor plan parts.

4. The system of claim 1, wherein the one or more computer programs stored in the memory for execution by the one or more computing devices are further configured for aligning the two or more floor plan parts based at least in part on resolving rotational ambiguities among the two or more floor plan parts.

5. The system of claim 1, wherein the one or more computer programs stored in the memory for execution by the one or more computing devices are further configured for aligning the two or more floor plan parts based at least in part on resolving scaling mismatches among the two or more floor plan parts.

6. The system of claim 1, wherein the one or more computer programs stored in the memory for execution by the one or more computing devices are further configured for determining the geometric constraint matrix using connected component analysis.

7. The system of claim 1, wherein the one or more computer programs stored in the memory for execution by the one or more computing devices are further configured for inferring a joint camera height for the multiple flat images based at least in part on an assumption that camera height is equal in each flat image of the multiple flat images.

8. A method comprising:
   receiving, by one or more computing devices, a request to produce a 3D model of an indoor scene based on multiple flat images of the indoor scene, wherein the multiple flat images of the indoor scene obey no more than a limited overlap requirement, are absent of depth information, and are taken from one or more viewpoints;
   determining, by the one or more computing devices, vanishing points in the multiple flat images;
   receiving, by the one or more computing devices, floor contour information, wherein the floor contour information consists of polygons, edges and vertices determined based at least in part on the vanishing points;
   reconstructing, by the one or more computing devices using a geometric constraint matrix that contains coordinate equalities among said vertices, 3D vertex positions of two or more floor plan parts based at least in part on the floor contour information;
   determining, by the one or more computing devices, a combined floor plan based at least in part on the two or more floor plan parts, received length information, wherein the length information contains lengths of edges and groupings of edges of equal length, and received point correspondence information, wherein the point correspondence information indicates corresponding vertices among different images;
   receiving, by the one or more computing devices, floor plan outline information, wherein the floor plan outline information indicates walls in the indoor scene and was determined based at least in part on the combined floor plan; and
   generating, by the one or more computing devices, the 3D model of the indoor scene based at least in part on the floor plan outline information.

9. The method of claim 8, further comprising displaying the 3D model on a graphical user interface.

10. The method of claim 8, further comprising rendering the generated model in a head-mounted display.

11. The method of claim 8, further comprising receiving floor plan trace information as the floor plan outline information, wherein the floor plan trace information is indicated by a user on a graphical user interface displaying the combined floor plan.

12. The method of claim 11, wherein the graphical user interface on which the user indicated the floor plan trace information allows the user to opt to snap to vertex positions and introduce new vertices.

13. The method of claim 11, wherein the graphical user interface on which the user indicated the floor plan trace information enforces right angles in the floor plan trace information.

14. The method of claim 8, wherein a graphical user interface on which a user indicates the floor contour information, displays vanishing point crosshairs that show vanishing lines to guide the user to correctly draw floor contour information and indicate point correspondences in parts of a displayed image occluded by foreground objects.

15. The method of claim 8, further comprising inferring a joint camera height for the multiple flat images based at least in part on an assumption that camera height is equal in each flat image of the multiple flat images.

16. A non-transitory computer readable medium storing instructions which, when executed by one or more computing devices, cause the one or more computing devices to perform a process of:
- receiving a request to produce a 3D model of an indoor scene based on multiple flat images of the indoor scene, wherein the multiple flat images of the indoor scene obey no more than a limited overlap requirement, are absent of depth information, and are taken from one or more viewpoints;
- determining vanishing points in the multiple flat images;
- receiving floor contour information, wherein the floor contour information consists of polygons, edges and vertices determined based at least in part on the vanishing points;
- reconstructing, by the one or more computing devices using a geometric constraint matrix that encodes coordinate equalities among of said vertices, 3D vertex positions of two or more floor plan parts based at least in part on the floor contour information;
- determining a combined floor plan based at least in part on the two or more floor plan parts, received length information, wherein the length information contains lengths of edges and groupings of edges of equal length, and received point correspondence information, wherein the point correspondence information indicates corresponding vertices among different images;
- receiving floor plan outline information, wherein the floor plan outline information indicates walls in the indoor scene and was determined based at least in part on the combined floor plan; and
- generating the 3D model of the indoor scene based at least in part on the floor plan outline information.

17. The non-transitory computer readable medium of claim 16, the process further comprising receiving additional vanishing lines and their classifications from a user.

18. The non-transitory computer readable medium of claim 16, the process further comprising receiving the floor contour information with connected oriented and un-oriented edges.

19. The non-transitory computer readable medium of claim 16, the process further comprising assembling the combined floor plan based at least in part on the two or more floor plan parts and the length information.

20. The non-transitory computer readable medium of claim 16, the process further comprising inferring a joint camera height for the multiple flat images based at least in part on an assumption that camera height is equal in each flat image of the multiple flat images.

21. The non-transitory computer readable medium of claim 16, the process further comprising receiving an indication of one or more openings in the indicated walls and generating the 3D model based at least in part on the one or more openings.

* * * * *